United States Patent [19]

Sutorius et al.

[11] Patent Number: 5,667,712
[45] Date of Patent: Sep. 16, 1997

[54] EXPANDABLE MULTI-SEGMENT BAND HEATER CONSTRUCTION WITH IMPROVED ELECTRICAL CONNECTION

[75] Inventors: Richard E. Sutorius, Florissant; Steven M. Klump, St. Louis, both of Mo.

[73] Assignee: Watlow Electric Manufacturing Company, St. Louis, Mo.

[21] Appl. No.: 602,926

[22] Filed: Feb. 16, 1996

[51] Int. Cl.⁶ ............................. H05B 3/58; H01C 1/028
[52] U.S. Cl. ................ 219/535; 219/542; 219/544; 338/289; 338/248; 338/249
[58] Field of Search .......................... 219/528, 535, 219/541–542, 544; 338/243, 247, 254–255, 249, 276, 288–289, 295, 314, 311–312; 392/459

[56] References Cited

U.S. PATENT DOCUMENTS

| | | | |
|---|---|---|---|
| 2,012,977 | 9/1935 | Trent et al. | 338/241 |
| 2,139,786 | 12/1938 | Wiegand | 338/241 |
| 3,730,373 | 5/1973 | Kozbelt | 219/535 |
| 3,827,281 | 8/1974 | Krieg et al. | 219/535 |
| 3,831,004 | 8/1974 | Wallstrom | 219/535 |
| 3,912,907 | 10/1975 | Lodi | 219/535 |
| 4,203,197 | 5/1980 | Crandell | 29/611 |
| 4,292,503 | 9/1981 | Brent | 219/535 |
| 5,359,179 | 10/1994 | Desloge et al. | 291/541 |

Primary Examiner—Teresa J. Walberg
Assistant Examiner—Raphael Valencia
Attorney, Agent, or Firm—Haverstock, Garrett & Roberts

[57] ABSTRACT

An expandable band heater having multiple heater segments wherein a jumper type arrangement is utilized between heater segments to reduce the number of sets of lead wires or other termination configuration for providing power to each of the heater segments. In a two segment band heater construction, each of the first and second heater segments includes a heating element sandwiched between two or more layers of insulation material, each heating element having end portions attachable to a pair of terminal members, a housing member enclosing the heater segments and enabling all of the terminal members to protrude therefrom; a single lead wire set including at least two conductors and at least one jumper connection extending between the terminal members associated with the first and second heater segments, the conductors of the lead wire set and the jumper connector(s) being connectable to the terminal members such that the first and second heater segments of a given band heater can be connected in either a series arrangement or a parallel arrangement, in accordance with the specific requirements of the end user.

21 Claims, 3 Drawing Sheets

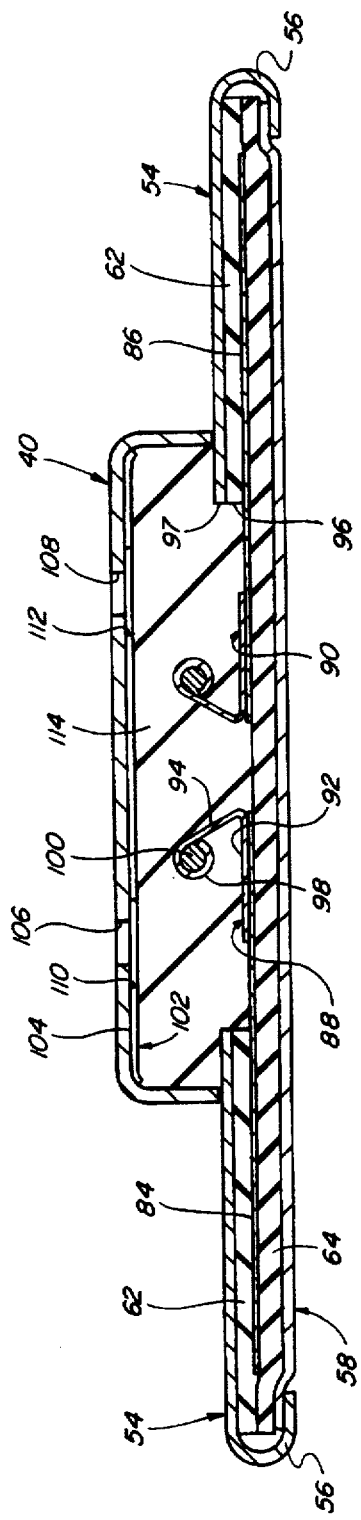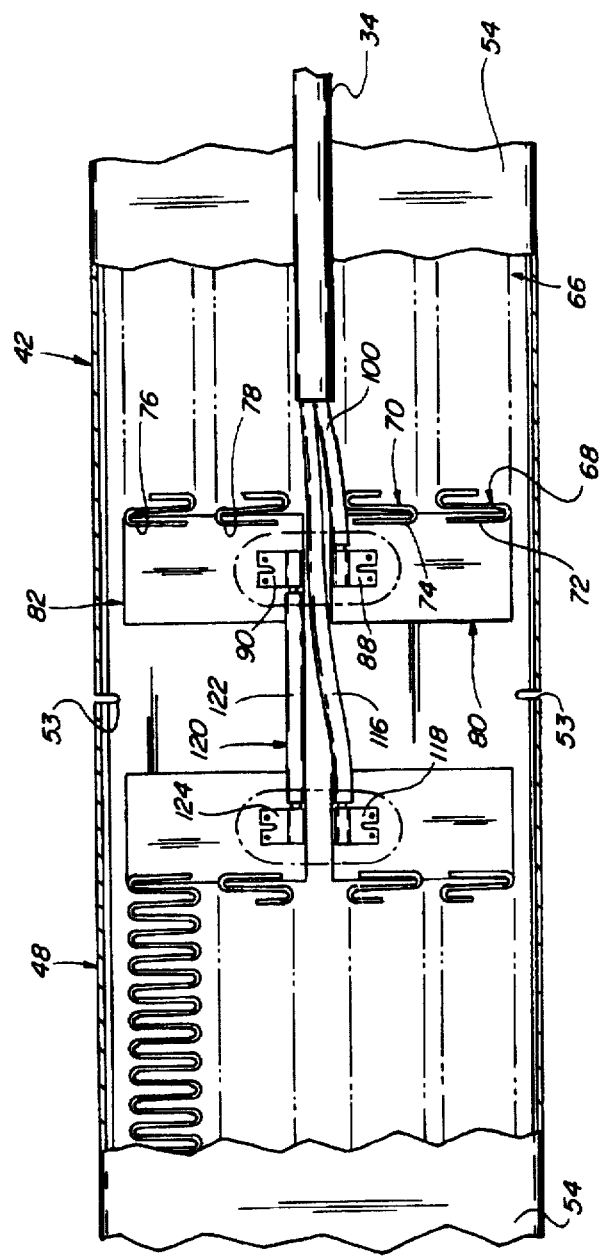

ns and, n an er of rably der to ents of heater e and, te and wires th the rovide heater heater ly the ously the ell as d volt- an be formed eting luces e manu- to the an be band NTION ned and variety of molding ss ingly, upon the h heaters of the end plication of the end formance charac- particular band expandability 45 ion purposes. In this regard, ted so as to be either ing upon how they ar object to be heated. For heater can be easily 50 lindrical object to be ce or interference from other ached to the particular object to ble band heater may be utilized. On band heaters are commonly used 55 non-expandable band heater would of objects or other components prohib- the band heater over the particular object d. Such expandable band heaters may be opened up, or expanded, to allow them to be fitted around the 60 particular cylindrical object to be heated without requiring removal of any of the obstructions. This expansion capabil- ity is typically provided by either notching or scoring the metal sheath which encloses the heater elements, or by constructing the metal heater sheath so as to include an 65 expansion seam or joint positioned intermediate the opposite end portions of the heater.

EXPANDABLE MULTI-SEGMENT BAND HEATER CONSTRUCTION WITH IMPROVED ELECTRICAL CONNECTION

FIELD OF THE INVENTION

The present invention relates generally to heaters and, more particularly, to several embodiments of an improved expandable band heater construction having multiple heater segments, which constructions require a reduced number of sets of lead wires or other termination means, and preferably only one lead wire or other termination set, in order to provide power to each of the respective heater segments of the band heater. The present multi-segment band heater constructions therefore reduce installation time and, importantly, enable a manufacturer to partially fabricate and assemble a multi-segment band heater without lead wires extending therefrom such that, in accordance with the requirements of the end user, final fabrication can provide either a series or a parallel connection of the multiple heater segments. The partially fabricated multi-segment band heaters of the present invention can therefore be advantageously utilized in multiple applications by providing the same power output at two different applied voltages as well as by providing two different power outputs at one applied voltage. Thus, the present multi-segment band heaters can be stocked in advance with final manufacturing to be performed based upon specified end user requirements. This facilitates reductions in the stock inventory requirements of the manufacturer and speeds up delivery of the finished product to the end user. Importantly, the present constructions can be adapted for utilization with currently manufactured band heaters.

BACKGROUND OF THE INVENTION

A wide variety of band heaters have been designed and manufactured over the years for use in a wide variety of industrial applications, including use on injection molding extrusion nozzles, barrels, blown film dies, and process heating for tanks and plattens, to name a few. Accordingly, band heaters are typically custom fabricated based upon the particular specifications of the end user so that such heaters will be appropriate for the specific application of the end user. Besides specifying the particular performance characteristics and operating factors desired in a particular band heater unit, the end user specifies the degree of expandability of the unit necessary for installation purposes. In this regard, band heaters are typically fabricated so as to be either expandable or non-expandable depending upon how they will be attached to the particular object to be heated. For those applications where the band heater can be easily slipped over one end of the particular cylindrical object to be heated without any hindrance or interference from other objects associated with or attached to the particular object to be heated, a non-expandable band heater may be utilized. On the other hand, expandable band heaters are commonly used where installation of a non-expandable band heater would require the removal of objects or other components prohibiting the sliding of the band heater over the particular object to be heated. Such expandable band heaters may be opened up, or expanded, to allow them to be fitted around the particular cylindrical object to be heated without requiring removal of any of the obstructions. This expansion capability is typically provided by either notching or scoring the metal sheath which encloses the heater elements, or by constructing the metal heater sheath so as to include an expansion seam or joint positioned intermediate the opposite end portions of the heater.

Certain types of expandable band heaters must be constructed as multiple segment heaters in order to protect the insulation material contained therein which would otherwise bridge the expansion seam or joint and be subject to cracking or other damage during expansion. This is particularly true in multi-segment band heaters utilizing layers of organically bound ceramic particles such as aluminum oxide and/or magnesium oxide, or any combinations thereof, as such insulation materials when baked out to cure the same become somewhat inflexible or brittle and are highly susceptible to cracking or other damage when the heater is expanded or spread apart for installation purposes, particularly in the vicinity of the expansion seam. Such cracking and/or other damage to the insulation material at any point within the metal sheath decreases performance and reliability of the band heater since various components of the band heater may have a tendency to loosen, short-out, oxidize during operation, and/or otherwise result in performance problems. Accordingly, such band heaters are manufactured so as to include multiple heater segments, typically, one heater segment on each opposite side of the expansion seam or joint, although any plurality of heater segments can be utilized in any particular band heater construction depending upon the overall diameter or size of such heater. The internal configuration of each heater segment may be constructed in accordance with known constructions such as, for example, those described in U.S. Pat. Nos. 5,359,179 and 4,203,197. Because there is no internal electrical connection across the expansion seam connecting the heating element or resistance wire associated with each heater segment, such prior art constructions require a separate set of termination leads for each separate heater segment housed in a common sheath. This not only increases the overall cost of the heater, but such construction likewise complicates the connection of such heaters to a power source. FIGS. 1 and 2 illustrate examples of such prior art constructions. There is therefore a need for an expandable multi-segment band heater construction which utilizes a reduced number of sets of lead wires or other termination connections in order to provide power to each of the heater segments.

SUMMARY OF THE INVENTION

The present multi-segment band heater construction overcomes the aforementioned problems and other disadvantages associated with the construction, assembly, and utilization of known multi-segment band heaters and teaches the construction and operation of several embodiments of an improved multi-segment band heater assembly in which the multi-segment band heater includes a reduced number of sets of lead wires or other termination means extending therefrom, and preferably includes only one lead wire set extending therefrom. As opposed to currently manufactured multi-segment band heater constructions, the present band heater constructions utilize a jumper connection or connections between pairs of heater segment terminals wherein one pair of terminals is associated with each heater segment for providing electrical current thereto. The jumper connection may be made such that multiple heater segments are connected in either a series or a parallel arrangement. This allows a basic multi-segment band heater assembly to be constructed including the desired number of heater segments and corresponding desired number of pairs of terminals such that the basic assembly can be stocked in inventory without a specific lead wire termination arrangement for connection to a power source attached thereto. The lead wires and jumper connections may then later be added to the basic multi-segment heater assembly to provide a final construction as required by an end user. In this regard, such heater termination options typically include the use of lead wires housed within either a loose or a tight stainless steel braid sleeving, leads housed within a flexible conduit, leads housed within a fiberglass sleeving, and still other variations. Also, post terminals may likewise be utilized and provide a quick connection with ring or fork connectors, or buss strips. Terminal protection in the form of lead caps, ceramic terminal covers and metallic terminal boxes are also available for use depending upon the particular application.

With respect to the jumper connections provided in association with the present multi-segment band heater construction, the ability to provide either a series or a parallel connection between pairs of terminals facilitates multiple uses of the basic multi-segment band heater assembly. In this regard, each heater segment of a multi-segment band heater is typically constructed to have a single resistance, that is, the heating element of each heater segment has the same resistance in order to provide substantially uniform heating around substantially the entire band. Utilizing the jumper connections of the present construction, the heater segments of a basic single resistance multi-segment band heater assembly can be connected in either a series or a parallel connection to provide the same power output or wattage at two different applied voltages, where, in the case of a two heater segment construction, the magnitude of the voltage applied for the series connection is twice the magnitude of the voltage applied for the parallel connection. In currently manufactured multi-segment band heater constructions, a change in applied voltage results in a change in wattage and a corresponding change in heat produced. Thus, the single wattage capability provided by the present construction, under different applied voltages, further enhances the ability to inventory the basic multi-segment band heater assembly, improving turnaround time and delivery of the product to the end user. Moreover, the basic multi-segment band heater assembly may also be utilized to provide alternative wattages at a specified voltage. Thus, in the case of a two heater segment assembly, if the two segments are connected to the specified voltage in a series arrangement, the wattage of each segment will be one fourth (¼) of the wattage when the two segments are connected to the specified voltage in a parallel arrangement. Currently manufactured multi-segment band heaters provide only one wattage for a specified voltage. Accordingly, the jumper connections associated with the present multi-segment band heater construction increase the range of applications for a given basic multi-segment band heater assembly.

The present jumper connections are likewise adaptable for use with many of the known band heater constructions presently in use. This includes the conventional single wound element arrangement which comprises a single resistance wire wrapped around a sheet of insulator material; the parallel or bifilar wound arrangement which comprises two resistance wires wrapped around a sheet of insulator material; a sinuated wire arrangement wherein the sinuated wire is sandwiched or otherwise embedded between two or more sheets of insulator material; and still other heating element and winder constructions. Also, the present jumper connections are adaptable for use in constructions which utilize any number of insulating layers of material adjacent opposite sides of the heating element. Such internal heating element configurations are usually dependent upon the performance characteristics of the heater as well as the particular construction associated with the heating element utilized therein. Also, the present jumper connections are adaptable for use with any type of insulator material such as mica, sheets of organically bound ceramic particles such as aluminum oxide and/or magnesium oxide, and any combinations thereof. Regardless of the internal workings and material composition of such heaters, all of the features and capabilities afforded by the present multi-segment band heater construction and associated jumper connections provide important advantages over known band heater constructions.

Furthermore, when constructed in accordance with the teachings contained herein, the lead wires and lead caps of the present multi-segment band heater constructions provide a substantially low profile with respect to the outer circumference of the heater. This is achieved by providing lateral or circumferential entry of the lead wires and jumper connections into the lead caps, whereas, in many currently manufactured constructions, the lead wires, or bolt-type terminals, extend radially outward beyond the lead caps. In the present construction, the lead wire set may extend from the lead caps circumferentially around an outer portion of the metal sheath and, in such cases, one or more strain relief clips or connectors may be provided along the outer portion of the heater sheath to secure the lead wire set adjacent the outer portion of the heater and, importantly, to reduce the strain on the connection between the conductors of the lead wire set and the heater segment terminals located within the lead cap. Accordingly, the present construction provides a multi-segment band heater which facilitates installation and use in applications having reduced clearance. Also associated with the lead caps of the present construction is an insulation material which is applied by an injection process so as to fill substantially all voids within the lead caps. The insulation material provides electrical insulation and, advantageously, facilitates operation of the present constructions at high currents by conducting heat away from the terminals thereby reducing the likelihood of failure at high currents.

It is therefore a principal object of the present invention to provide a multi-segment band heater construction which requires a reduced number of sets of lead wires, and preferably only one set of lead wires, for installation and operation thereof.

Another object of the present invention is to provide a multi-segment band heater construction which facilitates construction of a basic band heater which may be finally fabricated for a variety of applications as required by the end user, thereby allowing manufacturers to reduce their inventory while still offering a broad selection of such heaters.

Another object is to provide a multi-segment band heater construction which will reduce and improve the time needed to deliver such heaters to the end user.

Another object is to provide a multi-segment band heater construction which facilitates operation at high currents.

Another object is to provide an improved electrical connection for multi-segment band heaters which can be adapted for use in association with various known band heater constructions.

Another object is to provide a multi-segment band heater construction which can be more easily expanded to fit around the particular surface to be heated without detrimentally affecting or otherwise interfering with or hindering the overall performance and reliability of such unit.

Another object is to provide a more reliable heater and one which is not easily susceptible to premature heater failure.

Another object is to teach the construction and operation of an improved expandable multi-segment band heater.

These and other objects and advantages of the present invention will become apparent to those skilled in the art after considering the following detailed specification in conjunction with the accompanying drawings.

BRIEF DESCRIPTION OF THE DRAWINGS

FIG. 4 is a cross sectional view through an assembled band heater unit taken along line 4—4 of FIG. 3;

FIG. 5 is a partial top plan view of one embodiment of the present multi-segment band heater showing the lead caps associated therewith removed, a portion of the metal sheath and outer insulation layer cut away to expose the resistive element wires, and a jumper connection forming a series electrical connection between the two heater segments;

DETAILED DESCRIPTION OF THE DRAWINGS

Figure 1:
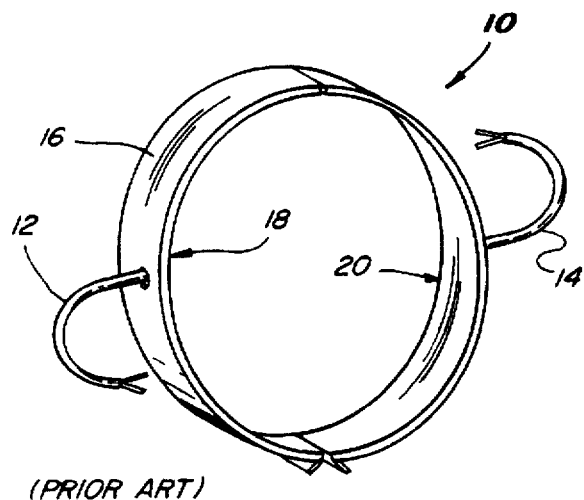
FIG. 1 is a perspective view of a prior art two segment band heater construction having two sets of lead wires extending radially therefrom, the two sets of lead wires being positioned and located in diametrically opposed relationship to each other, one set extending from each respective heater segment.
Figure 2:
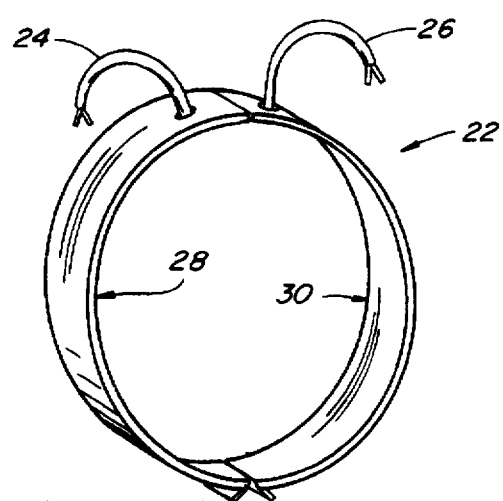
FIG. 2 is a perspective view of a prior art two segment band heater construction having two sets of lead wires extending radially therefrom, one set extending from each heater segment, the two sets of lead wires being positioned and located in close proximity to an expansion seam positioned between the two heater segments.

Referring to the drawings more particularly by reference numbers, wherein like numbers refer to like parts, number 10 in FIG. 1 identifies a prior art two segment band heater construction having two sets of lead wires 12 and 14 extending radially outwardly from an outer circumferential metal sheath portion 16, each lead wire set 12 and 14 extending from a respective heater segment 18 and 20. Lead wire set 12 is positioned approximately one hundred eighty degrees (180°) circumferentially from lead wire set 14 such that the two lead wire sets are substantially diametrically opposed. FIG. 2 also illustrates a prior art two segment band heater construction 22 having two lead wire sets 24 and 26 extending radially outwardly from respective heater segments 28 and 30, except that in band heater 22, both lead wire sets 24 and 26 extend from a location in close proximity to each other as compared with the lead wire arrangement associated with band heater 10 of FIG. 1. Both of the illustrated prior art band heaters 10 and 22 include the aforementioned disadvantages such as requiring two different connections or sources for applied voltage thereby increasing the installation labor and time required of the end user. Moreover, the prior art band heaters 10 and 22 have limited applications because each band heater 10 and 22 only facilitates operation at one wattage per each specified voltage thereby requiring different band heater constructions to achieve the same power output under different applied voltages. Further, in both prior art band heaters 10 and 22, the lead wire sets 12, 14, 24, 26 extend in a radially outward direction thereby requiring an excessive amount of clearance for installation and operation in some applications.

Figure 3:
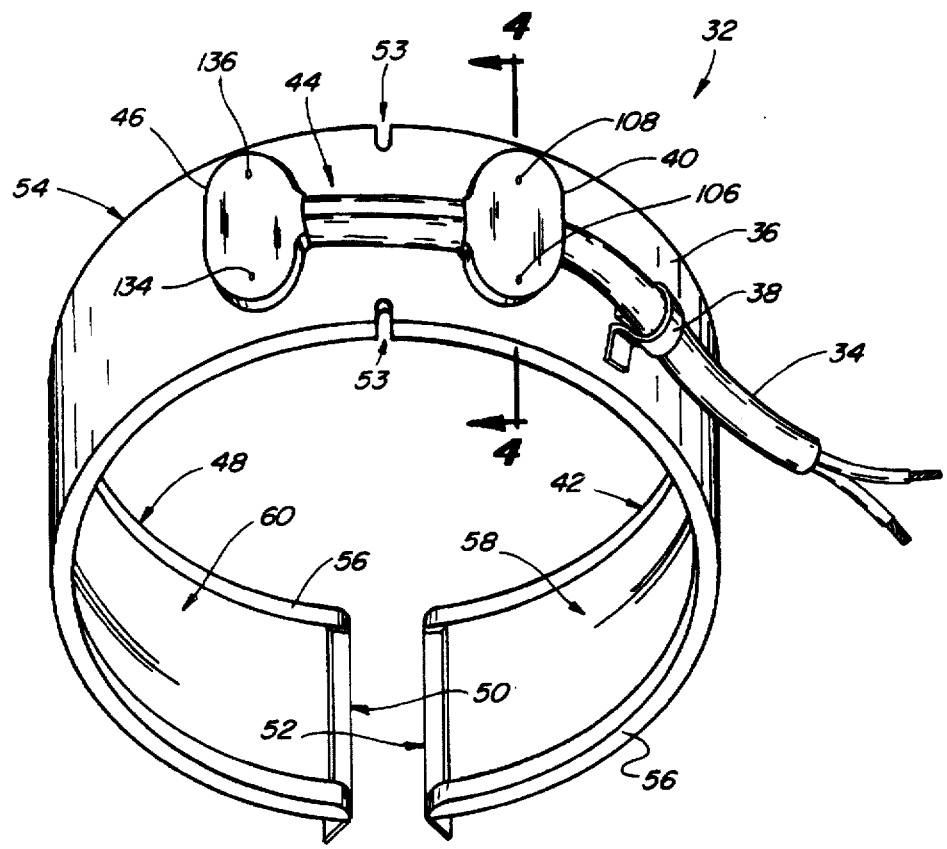
FIG. 3 is a perspective view of a multi-segment band heater constructed in accordance with the teachings of the present invention, the present heater including one set of lead wires extending therefrom and a jumper connection extending between the two heater segments.

A multi-segment band heater 32 constructed in accordance with the teachings of the present invention is illustrated in FIG. 3 and includes one lead wire set 34 extending from an outer circumferential portion 36 thereof. The lead wire set 34 extends through a strain relief clip or other securing means 38 into a first lead cap 40, the lead cap 40 being associated with heater segment 42 of the band heater 32. A jumper connection 44 extends from the first lead cap 40 to a second lead cap 46, the second lead cap 46 being associated with heater segment 48. The band heater 32 includes opposite end portions 50 and 52 as well as notches 53 which facilitate expansion of the band heater 32 for purposes of installation. In this regard, upon installation, band heater 32 requires only one connection to an applied voltage source, across lead wire set 34, in order to power both heater segments 42 and 48. This considerably reduces the installation time required of the end user.

Figure 6:
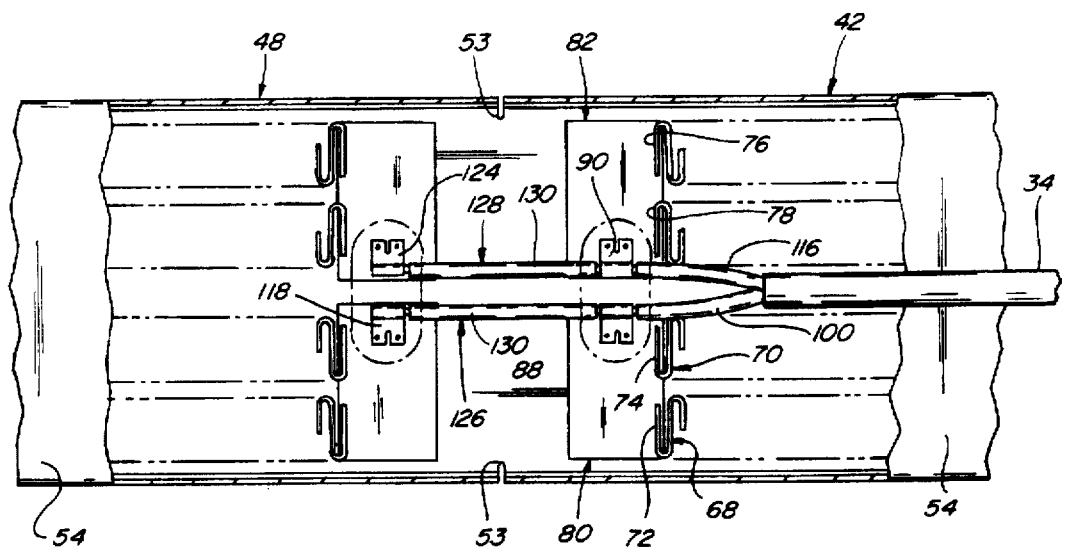
FIG. 6 is a partial top plan view of another embodiment of the present multi-segment band heater similar to FIG. 5 showing the lead caps associated therewith removed, a portion of the metal sheath and outer insulation layer cut away to expose the resistive element wires, and jumper connections forming a parallel electrical connection between the two heater segments.
Figure 7:
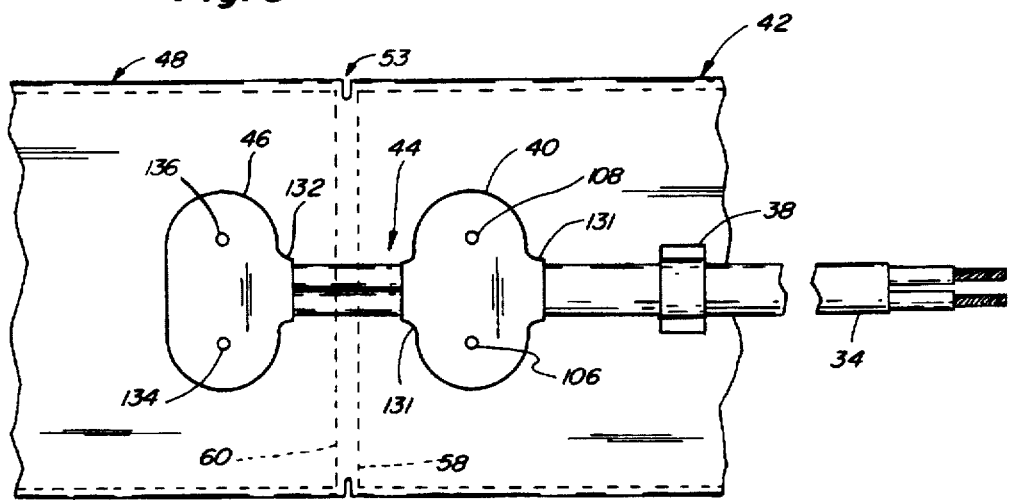
FIG. 7 is a partial top plan view of the multi-segment band heater of FIG. 3 illustrating the two lead caps, associated jumper connection, and lead wires extending therefrom.
Figure 8:
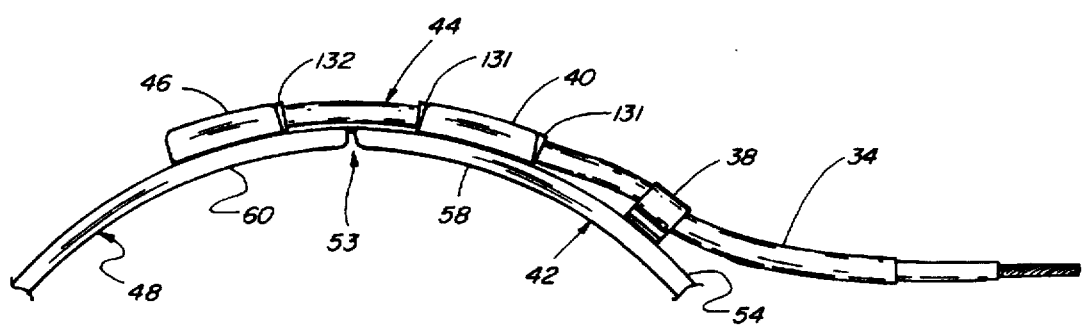
FIG. 8 is a partial side elevational view of the multi-segment band heater of FIG. 3 illustrating the circumferential entry of the lead wires and jumper connection into the lead caps and use of a strain relief connector to secure the lead wire set adjacent the metal sheath of the heater.

As shown in the cross-sectional view of FIG. 4, each segment 42 and 48 of the present band heater 32 includes a channel shaped outer sheath or cover member 54 which is generally made of a metallic material and includes overturned sidewall members 56 which engage an interior or bottom cover or plate member associated with each heater segment such as the member 58 which forms the inner circumferential surface of heater segment 42. The plate member 58 is likewise generally made of a metallic material and is dimensioned so as to be received within the channel shaped cover member 54. Each heater segment 42 and 48 (FIGS. 3 and 7) typically includes a separate inner plate member 58 and 60 respectively in order to facilitate expansion of the band heater 32 as best shown in FIGS. 7 and 8, while a single common outer sheath 54, which may include notches 53, is typically utilized for both segments. Enclosed within and between the outer sheath 54 and the respective interior plate members 58 and 60 are outer and inner layers of insulation material 62 and 64 which have a corresponding heating element 66 as best shown in FIGS. 5 and 6 sandwiched therebetween. Typical band heater constructions are disclosed in U.S. Pat. Nos. 5,359,179 and 4,203,197. The sheets of insulation material 62 and 64 effectively insulate the corresponding heating element 66 from the respective metallic heater conducting members 54, 58 and 60 as explained in U.S. Pat. No. 5,359,179. Insulator sheets 62 and 64 are typically comprised of either mica or high density ceramic particles bound together by a suitable binder, or any other suitable insulating materials. The ceramic particles typically include particles of aluminum oxide, magnesium oxide, boron nitride, or silicon dioxide. All of these materials have excellent dielectric strength, the ceramic materials being capable of operating at somewhat higher temperatures as compared to mica and some other known suitable materials.

With reference to FIG. 5 and heater segment 42 thereof, in which a portion of the outer sheath 54 and corresponding portion of the insulation layer 62 are cut away, the heating element 66 may include a pair of resistive element wires 68 and 70 which extend circumferentially along the heater segment 42. Each resistive element wire 68 and 70 includes respective first ends 72 and 74 and respective second ends 76 and 78, the first wire ends 72 and 74 being connected to a winding plate 80 and the second wire ends 76 and 78 being connected to a winding plate 82, both winding plates being of the same general configuration and both being formed of a metallic, conductive material. The resistive element wires 68 and 70 are generally formed of a ribbon NICHROME wire, although any suitable high temperature electrical resistance means can be utilized. Wire ends 72, 74, and 76, 78 are typically spot welded to respective winding plates 80 and 82, although other known means of joinder could be utilized for such connections. In the particular construction illustrated in FIG. 5, parallel resistance paths are created between winding plates 80 and 82, however, it is understood that other known constructions for heating element 66 could be utilized.

As best shown in FIG. 4, each winding plate 80 and 82 includes a portion 84 and 86 respectively, which portions are sandwiched between the insulation layers 62 and 64 whereby each winding plate 80 and 82 is held securely in place. Extending from each winding plate 80 and 82 is a respective tab portion or jumper terminal 88 and 90, such jumper terminals 88 and 90 being attached to winding plates 80 and 82 by known means such as spot welding the same thereto. The jumper terminals 88 and 90 are generally formed from a metallic material and are of similar configuration. With reference to jumper terminal 88, a respective first portion 92 is attached to winding plate 80, and a second outwardly extending portion 94 extends through a slot or other opening 96 formed in the outer insulation layer 62 as well as through a similarly configured slot or opening 97 formed in the outer sheath 54. The outwardly extending portion 94 further includes a conductor receiving portion 98 having a conductor 100 attached thereto, the conductor receiving portion 98 being formed by a curved or otherwise overturned portion of the jumper terminal 88. In this regard, conductor 100 is preferably spot welded to receiving portion 98 so as to fuse the conductor 100 thereto, while simultaneously providing at least some crimping of the receiving portion 98 around the conductor 100 as a result of the pressure applied during the spot welding operation. Such spot welding advantageously aids in preventing oxidation problems caused by repetitive heating and cooling of connections which are only crimped, although such crimp-type connections may be utilized.

The lead cap 40 is fixedly attached to the outer sheath 54, typically, by welding the same thereto so as to effectively cover the sheath opening 97 and the jumper terminals 88 and 90. The cap member 40 includes an electrical insulator 102 secured to the interior of the upper cap surface 104 as well as a pair of openings 106 and 108 likewise extending through the upper surface 104 (FIGS. 3 and 7), the electrical insulator 102 including corresponding openings 110 and 112 aligned therewith as best shown in FIG. 4. The region within lead cap 40 is filled with an insulating material 114, preferably a magnesium oxide based dielectric cement, which is an effective electrical insulator and also has an advantageous thermoconductive property, although other insulating materials may also be utilized. The insulating material 114 facilitates high amperage current flow capability through the jumper terminals 88 and 90 in that it acts as a heat sink and conducts heat away from the jumper terminals 88 and 90 thereby reducing the effective temperature of such terminals. If the temperature of jumper terminals 88 and 90 is too high, failure of the terminals 88 and 90 as well as corresponding failure of the band heater 32 may result. Thus, the insulating material 114 within the lead cap 40 reduces the likelihood of band heater 32 failure in high amperage applications including applications as high as 18 amps.

Utilizing the present construction disclosed above, a basic multi-segment band heater assembly may be produced wherein each heater segment housed therewithin includes an inner plate member 58 or 60, a heating element 66 sandwiched between inner and outer insulation layers 62 and 64, a pair of winding plates 80 and 82, respective jumper terminals 88 and 90, and an outer sheath or cover member 54 enclosing the same, the remaining termination means for connecting to a power source to be added at a later time. Accordingly, the basic band heater assembly just described may be produced and stocked in inventory with final fabrication and termination configuration being predicated upon the particular application and operating needs of the end user. In this regard, with reference to FIGS. 5 and 6, final manufacture may include connecting heater segments 42 and 48 in series or in parallel in order to achieve required wattage and voltage requirements. In FIG. 5, a series connection is illustrated in which one conductor 100 of lead wire set 34 terminates in jumper terminal 88 of heater segment 42 and a second conductor 116 of lead wire set 34 terminates in jumper terminal 118 associated with heater segment 48, the conductor 116 passing between the jumper terminals 88 and 90. Accordingly, it is preferred that jumper terminals 88 and 90 be sufficiently spaced so as to allow conductor 116 to pass therebetween. A jumper connection 120 is provided by a conductor 122 which extends between jumper terminal 90 of heater segment 42 and jumper terminal 124 of heater segment 48. Conductor 122 is preferably spot welded to each jumper terminal 90 and 124 as described above. In this configuration, a voltage $V_{APP}$ applied across lead wire set 34 results in a current flow, for example, along conductor 100, through heater segment 42, along jumper connection 120, through heater segment 48, and back along conductor 116 to the applied source (not shown). Accordingly, current flows in a series path, first through heater segment 42 and then through heater segment 48, such that each heater segment has a voltage drop thereacross which is equal to one half (½) the applied voltage $V_{APP}$ when each segment has the same resistance.

FIG. 6 illustrates a parallel connection between heater segments 42 and 48 wherein conductor 100 is connected to jumper terminal 88 and conductor 116 is connected to jumper terminal 90. A pair of jumper connections 126 and 128 extend from jumper terminals 88 and 90 to respective jumper terminals 118 and 124. Jumper connections 126 and 128 are preferably achieved utilizing conductors 100 and 116 wherein one end of each conductor 100 and 116 is connected to a respective jumper terminal 118 or 124 and an intermediate portion of each such conductor 100 and 116 is similarly connected to a respective jumper terminal 88 or 90. In this configuration, an intermediate portion of the outer jacket of each conductor 100 and 116 is removed in order to spot weld the same to respective jumper terminals 88 and 90. The portion of each conductor 100 and 116 forming each respective jumper connection 126 and 128 includes the conductor jacket and, preferably, an additional overbraid protection 130 which may be formed of fiberglass or some other suitable material. It is also understood that jumper connections 126 and 128 could be formed from separate conductors, as was the jumper connection 120 of FIG. 5. Referring to the parallel configuration of FIG. 6, the same applied voltage $V_{APP}$ across lead wire set 34 results in a current flow down conductor 100 to jumper terminal 88, at which point half of the current flows through heater segment 42 to conductor 116 while the other half of the current flows through jumper connection 126, through heater segment 48 and back along jumper connection 128. Thus, each heater segment 42 and 48 has a voltage drop thereacross equal to the entire applied voltage $V_{APP}$.

Comparatively, each heater segment 42 and 48 of the series connection arrangement illustrated in FIG. 5 will have a power output equal to one fourth of that provided by the parallel connection arrangement illustrated in FIG. 6. Accordingly, the basic band heater assembly of the present invention can be finally manufactured to achieve two different power levels for the same applied voltage $V_{APP}$. Similarly, the present band heater assembly can be finally manufactured to achieve a required power level at two different applied voltages, where the magnitude of one voltage is twice the magnitude of the other voltage. This, in effect, allows the present basic band heater assembly to be used in multiple applications thereby facilitating the manufacturer's ability to inventory the basic assembly until an order is received from an end user, and likewise substantially improving turnaround time and delivery of the final product to the end user.

With regard to final manufacture of the present constructions, during which both the lead wire set and jumper connections are added, and with reference to FIG. 3, after the series or parallel connection has been made between heater segment 42 and heater segment 48, lead caps 40 and 46 are fixedly attached to the outer sheath 54 in order to cover all jumper terminals and otherwise exposed electrically conducting surfaces. The lead caps 40 and 46 are generally oval in shape and each include a plurality of weld projections (not shown) which facilitate the welding of the cap members 40 and 46 to the outer heater sheath 54 as best described in U.S. Pat. No. 5,359,179. As best shown in the partial top plan view of FIG. 7, lead cap 40 includes a pair of sidewardly or circumferentially extending flange portions 131, while lead cap 46 includes only one such portion 132. The flange portions 131 and 132 facilitate sideward or circumferential entry of lead wire set 34 into lead cap 40 and similar circumferential connection of lead caps 40 and 46 by jumper connection 44 as best shown in FIG. 8. Thus, as opposed to the prior art constructions of FIGS. 1 and 2, the present constructions require less clearance for installation and operation. FIG. 8 also illustrates use of a strain relief clip 38 which secures lead wire set 34 to the outer sheath 54 such that any tension placed on lead wire set 34 as a result of pulling or other manipulation thereof is exerted on strain relief clip 38 rather than the connections within lead caps 40 or 46. The strain relief clip 38 is typically welded to the outer sheath 54 and the lead wire set 34 and, with outer jacket intact, the strain relief clip 38 is tightly crimped to the lead wire set 34, although other know connection means could likewise be utilized.

Referring to FIG. 7, it is important to note that lead caps 40 and 46 each include a pair of openings, the openings 106 and 108 being associated with lead cap 40 and the openings 134 and 136 being associated with lead cap 46. After the lead caps have been welded to the outer sheath, openings 106, 108, 134 and 136 are utilized to inject insulation material therethrough such as the insulation material 114 best shown in FIG. 4. The insulation material 114 may be injected through each of the cap openings while in a liquid, or liquid-like state, in order to allow the insulation material to have some flow capability. After the interior regions of the lead caps 40 and 46 are filled, the finally manufactured construction is then baked or allowed to dry until the insulation material 114 cures to a solid. In its solid form, the insulating material 114 acts as an effective electrical insulator as well as a heat sink as described above. The insulating material 114 also aids in holding all parts in their required position should any connections therebetween come loose. It is also recognized that lead caps 40 and 46 could each be provided with only one opening, however, two or more openings are preferred for assuring complete and proper distribution of the insulation material 114 so as to substantially fill all voids therewithin.

From the preceding description of the illustrated embodiments, it is evident that the objects of the present invention have been achieved. In particular, the present constructions yield a multi-segment band heater construction which requires only one set of lead wires for installation and operation thereby substantially reducing the overall cost and installation time required by the end user. In addition, an improved electrical connection to multi-segment band heaters has been provided which is adaptable for use with many existing band heater constructions. Although the present invention has been described and illustrated with respect to the embodiments illustrated in FIGS. 3–8, it is also recognized and anticipated that a wide variety of other embodiments are also achievable and the embodiments illustrated in FIGS. 3–8 are intended by way of illustration and example only and are not to be taken by way of limitation. For example, with respect to the configuration of the jumper terminals associated with each heater segment, it is understood that other configurations are possible and it is further understood that the jumper terminals could be manufactured as integral extensions of the winding plates. Further, although the jumper connections herein have been shown with respect to jumper sets of terminals which are located in close proximity to the seam or expansion joint between the two heater segments, such jumper connections could also be associated with sets of jumper terminals which are located on other circumferential portions of the band heater, including constructions in which the sets of jumper terminals are substantially diametrically opposed. In such an arrangement, an intermediate portion of the jumper connections may run through one or more connectors similar to the strain relief connector 38 in order to secure the jumper connections to the circumferential periphery of the band heater. Moreover, although the drawings and description herein refer to a band heater construction including two heater segments, the jumper type connection provided herein may also be utilized to connect any plurality of heater segments which form a given multi-segment band heater.

Thus, there has been shown and described several embodiments of a novel expandable band heater construction, which constructions fulfill all of the objects and advantages sought therefor. Many changes, modifications, variations, and other uses and applications of the present heater constructions will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A band heater assembly having first and second heater segments, each heater segment including at least one resistive heating element having first and second end portions associated therewith, each of said resistive heating elements being located between an outer insulation layer and an inner insulation layer, each heater segment further including a first conductive plate member having the first end portion of said resistive heating element connected thereto and a second conductive plate member having the second end portion of said resistive heating element connected thereto, at least a portion of each of said first and second conductive plate members being located between said outer and inner insulation layers, each of said first and second plate members including terminal means associated therewith, at least a portion of each terminal means extending outwardly from its respective conductive plate member beyond said outer insulation layer, a circumferential housing member enclosing said heater segments and including an outer metal sheath forming an outer circumferential surface of said band heater assembly and at least one inner metal sheath forming an inner circumferential surface thereof, said outer metal sheath including first and second openings therethrough, said first sheath opening being circumferentially aligned with the terminal means of said first heater segment such that the outwardly extending portion of each terminal means of said first heater segment extend therethrough, said second sheath opening being circumferentially aligned with the terminal means of said second heater segment such that the outwardly extending portion of each terminal means of said second heater segment extend therethrough, and means for providing an electrical current path to each of said heater segments including a lead wire set having first and second conductors, said first conductor being electrically connected to one of the terminal means of said first heater segment and said second conductor being electrically connected to one of the terminal means of at least one of said heater segments, said means for providing an electrical current path further including at least one jumper connection extending between one terminal means of said first heater segment and one terminal means of said second heater segment such that when a voltage is applied to said lead wire set, a current flows through said jumper connection.

2. The band heater assembly of claim 1 wherein said first conductor is electrically connected to the terminal means associated with the first conductive plate member of said first heater segment, said second conductor being electrically connected to the terminal means associated with the first conductive plate member of said second heater segment, and said jumper connection extending from the terminal means associated with the second conductive plate member of said first heater segment to the terminal means associated with the second conductive plate member of said second heater segment such that said first and second heater segments are connected in a series arrangement.

3. The band heater assembly of claim 1 wherein said first conductor is electrically connected to the terminal means associated with the first conductive plate member of said first heater segment, said second conductor being electrically connected to the terminal means associated with the second conductive plate member of said first heater segment, said at least one jumper connection including a first jumper connection extending from the terminal means associated with the first conductive plate member of said first heater segment to the terminal means associated with the first conductive plate member of said second heater segment, and a second jumper connection extending from the terminal means associated with the second conductive plate member of said first heater segment to the terminal means associated with the second conductive plate member of said second heater segment such that said first and second heater segments are connected in a parallel arrangement.

4. The band heater assembly of claim 3 wherein said first jumper connection is formed by a portion of said first conductor and said second jumper connection is formed by a portion of said second conductor, said first conductor being electrically connected to the terminal means associated with the first conductive plate member of said second heater segment, said second conductor being electrically connected to the terminal means associated with the second conductive plate member of said second heater segment.

5. The band heater assembly of claim 1 further including first and second cap means attached to said outer metal sheath, said first cap means being positioned so as to cover the first opening in said outer metal sheath, said second cap means being positioned so as to cover the second opening in said outer metal sheath.

6. The band heater assembly of claim 5 further including an insulation material associated with each cap means and substantially filling the interior thereof, said insulation material surrounding and engaging a substantial portion of each terminal means within each cap means and being thermoconductive whereby heat generated within each terminal means as a result of current flow therethrough will be conducted away from said terminal means.

7. The band heater assembly of claim 6 wherein said first and second cap means each include at least one opening therethrough, said at least one opening of each cap means providing an entry point for said insulation material wherein said insulation material comprises a dielectric cement which may be injected through said opening.

8. The band heater assembly of claim 5 wherein each of said first and second cap means include a side portion, each of said first and second conductors and said at least one jumper connection entering at least one of said cap means along a side portion thereof.

9. The band heater assembly of claim 1 wherein the terminal means associated with each of said conductive plate members is welded thereto along an outer surface of the respective plate member.

10. The band heater assembly of claim 1 further including a clip member attached to the outer circumferential surface of said band heater assembly, said lead wire set extending through said clip member.

11. A band heater assembly having at least first and second heater segments, each heater segment including a heating element having first and second end portions associated therewith, said heating element being located between an outer insulation layer and an inner insulation layer, a circumferential housing member enclosing said heater segments and including an outer sheath forming an outer circumferential surface of said band heater assembly and at least one inner sheath forming an inner circumferential surface thereof, said outer sheath including first and second openings therethrough, said first opening being circumferentially aligned with the first and second end portions associated with the heating element of said first heater segment, said second opening being circumferentially aligned with the first and second end portions associated with the heating element of said second heater segment, and means for providing an electrical current path to the first and second end portions associated with the heating element of each of said heater segments, said path means comprising a lead wire set having first and second conductors, means associated with said first conductor for providing a current path to the first end portion associated with the heating element of said first heater segment, means associated with said second conductor for providing a current path to one of the end portions associated with the heating element of one of said heater segments, and means associated with said first and second heater segments for providing a current path from at least one end portion associated with the heating element of said first heater segment to at least one end portion of the heating element of said second heater segment whereby a voltage applied across the first and second conductors of said lead wire set results in a current flow through each of said heating elements.

12. The band heater assembly of claim 11 wherein said means associated with said second conductor includes means for providing a current path from said second conductor to the first end portion associated with the heating element of said second heater segment, and said means associated with said first and second heater segments includes means for providing a current path from the second end portion associated with the heating element of said first heater segment to the second end portion associated with the heating element of said second heater segment such that said first and second heater segments are connected in a series arrangement.

13. The band heater assembly of claim 12 wherein said means for providing a current path from said second conductor to the first end portion associated with the heating element of said second heater segment includes terminal means extending between said second conductor and said first end portion, and said means for providing a current path from the second end portion associated with the heating element of said first heater segment to the second end portion associated with the heating element of said second heater segment includes terminal means extending from each of said second end portions and a conductive member extending therebetween.

14. The band heater assembly of claim 11 wherein said means associated with said second conductor includes means for providing a current path from said second conductor to the second end portion associated with the heating element of said first heater segment, and said means associated with said first and second heater segments including means for providing a current path from the first end portion associated with the heating element of said first heater segment to the first end portion associated with the heating element of said second heater segment and means for providing a current path from the second end portion associated with the heating element of said first heater segment to the second end portion associated with the heating element of said second heater segment such that said first and second heater segments are connected in a parallel arrangement.

15. The band heater assembly of claim 14 wherein each end portion of the heating element of each heater segment includes a terminal means extending therefrom, each of said terminal means including a portion which extends through one of said openings in said outer sheath.

16. A substantially circumferential heater assembly having at least first and second heater segments, each heater segment extending around a circumferential portion thereof, said first and second heater segments each including a heating element having at least first and second end portions associated therewith and each of said end portions including terminal means electrically connected thereto, said first and second heater segments each further including a first dielectric member positioned adjacent one side of said heating element and a second dielectric member positioned adjacent the opposite side of said heating element such that said heating element is sandwiched therebetween, said first and second heater segments being enclosed within a housing member including an outer sheath member and an inner sheath member, said outer sheath member including first and second openings therethrough, said first opening being positioned adjacent the heating element of said first heater segment such that the terminal means associated with the first and second end portions thereof extend through said first opening, said second opening being positioned adjacent the heating element of said second heater segment such that the terminal means associated with the first and second end portions thereof extend through said second opening, and at least one conductive member extending from one of the terminal means associated with the heating element of said first heater segment to one of the terminal means associated with the heating element of said second heater segment.

17. The substantially circumferential heater assembly of claim 16 further including a first conductor and a second conductor extending from said heater assembly, said first conductor being connected to the terminal means associated with the first end portion of the heating element of said first heater segment, said second conductor being connected to the terminal means associated with the first end portion of the heating element of said second heater segment, said at least one conductive member being connected to the terminal means associated with the second end portion of the heating element of said first heater segment and being further connected to the terminal means associated with the second end portion of the heating element of said second heater segment.

18. The substantially circumferential heater assembly of claim 16 further including a first conductor and a second conductor extending from said heater assembly, said first conductor being connected to the terminal means associated with the first end portion of the heating element of said first heater segment, said second conductor being connected to the terminal means associated with the second end portion of the heating element of said first heater segment, said at least one conductive member including a first conductive member connected to the terminal means associated with the first end portion of the heating element of said first heater segment and being further connected to the terminal means associated with the first end portion of the heating element of said second heater segment, and a second conductive member connected to the terminal means associated with the second end portion of the heating element of said first heater segment and being further connected to the terminal means associated with the second end portion of the heating element of said second heater segment.

19. The substantially circumferential heater assembly of claim 18 wherein said first conductive member is formed by a portion of said first conductor, and said second conductive member is formed by a portion of said second conductor.

20. The substantially circumferential heater assembly of claim 16 further including first and second cap members, said first cap member covering the first opening of said outer sheath member and covering said terminal means which extend through said first opening, and said second cap member covering the second opening of said outer sheath member and covering said terminal means which extend through said second opening, both of said first and second cap members being substantially filled with an insulation material such that said insulation material substantially surrounds said terminal means therewithin.

21. The substantially circumferential heater assembly of claim 20 wherein said first and second cap members each include at least one flange on a sidewall portion thereof, each of said flanges being configured and sized to allow insertion therethrough of one or more conductors of a predetermined size.

* * * * *